US006977484B1

(12) United States Patent
Peng

(10) Patent No.: US 6,977,484 B1
(45) Date of Patent: Dec. 20, 2005

(54) CHARGER

(75) Inventor: Ta-Min Peng, Taoyuan (TW)

(73) Assignee: C.Q.S. Electrical Products Inc., Pingjhen (TW)

( * ) Notice: Subject to any disclaimer, the term of this patent is extended or adjusted under 35 U.S.C. 154(b) by 0 days.

(21) Appl. No.: 10/860,147

(22) Filed: Jun. 4, 2004

(51) Int. Cl.[7] .............................................. H02J 7/00
(52) U.S. Cl. ..................................... 320/137; 320/152
(58) Field of Search ............................... 320/137–165, 320/111–115, 127–130; 315/112–118, 86; 363/132–137

(56) References Cited

U.S. PATENT DOCUMENTS

| 4,920,475 A | * | 4/1990 | Rippel | 363/132 |
| 5,767,661 A | * | 6/1998 | Williams | 320/152 |
| 6,518,726 B1 | * | 2/2003 | Nowlin et al. | 320/128 |

* cited by examiner

Primary Examiner—Wilson Lee

(57) ABSTRACT

A charger includes a choke coil and a choke iron core disposed on a plane surface of heat dissipating fins. Furthermore, a face plate, a control circuit board, a drive circuit board, the heat dissipating fins, a fan and a ventilation plate are separately series-connected in alignment and fitted on a base thereof. The electric power from a power supply input is transmitted to the drive circuit board through an input terminal, whereupon alternating current passes through a rectifier circuit and is converted into direct current thereat. Upon charging, results from a detector are transmitted to a microprocessor, which effectuates switch over to an output circuit through transistors, while diodes prevent current reflux. The electric power is then transmitted to a battery by means of a transformer coupled to an electric power terminal and further passing through one more rectifier circuit and a wave filter circuit.

5 Claims, 4 Drawing Sheets

CHARGER

BACKGROUND OF THE INVENTION (a) Field of the Invention

The present invention-provides improvement on structure of a charger, and embodies characteristics including a choke coil and a choke iron core disposed on a plane surface of heat dissipating fins. Furthermore, a configuration is embraced whereby a face plate, a control circuit board, a drive circuit board, the heat dissipating fins, a fan and a ventilation plate adopt a separately series-connected alignment and are fitted on a base thereof, whereafter the configuration is covered with a case and screwed down with screws, whereupon a base portion is screwed down by means of base screws penetrating a base plate.

(b) Description of the Prior Art

Output current and voltage of a conventional charger must be adjusted in advance in order to prevent overloading electric quantity when charging, which would otherwise result in shortening service life of a battery, even causing burnout of the battery. Furthermore, when electric power output of the charger is unstable, the charger is unable to operate in coordination with batteries having different electric power mode, resulting in reducing service life of the battery and damage to same.

Hence, the inventor of the present invention expects to resolve and surmount existent technical difficulties in eliminating the aforementioned shortcomings.

SUMMARY OF THE INVENTION

The present invention provides improvement on structure of a charger. Electric circuits of the present invention are characterized in that electric power from a power supply input is transmitted to the drive circuit board through an input terminal, whereupon alternating current passes through a rectifier circuit and is converted into direct current thereat. Efficiency and stability of the electric power is enhanced through impedance matching generated by way of the choke coil, whereafter the electric power is transmitted to a wave filter circuit, thereby effectuating provision of steady direct current from the power supply.

Upon charging, a detector detects status of internal voltage, electric current and electric quantity of a battery, whereupon results from the detector are transmitted to a microprocessor, which thereupon selects a charging mode, and effectuates switch over to an output circuit mode through transistors, while diodes prevent current reflux. The electric power output is further stabilized through regulated integrated circuits, which simultaneously prevent the electric current generated by the battery being charged from backing up to other electric circuits. Stability of the electric power is further enhanced by means of a transformer coupled to an electric power terminal, whereupon the electric power further passes through one more rectifier circuit and a wave filter circuit, whereafter the electric power is transmitted to the battery.

Furthermore, when outputting the electric power, efficiency and stability of charging is enhanced through the impedance matching generated by the choke coil and the choke iron core, moreover, the choke coil is manufactured from ferrite core, which enhances anti-noise effect and high impedance matching of the choke coil.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
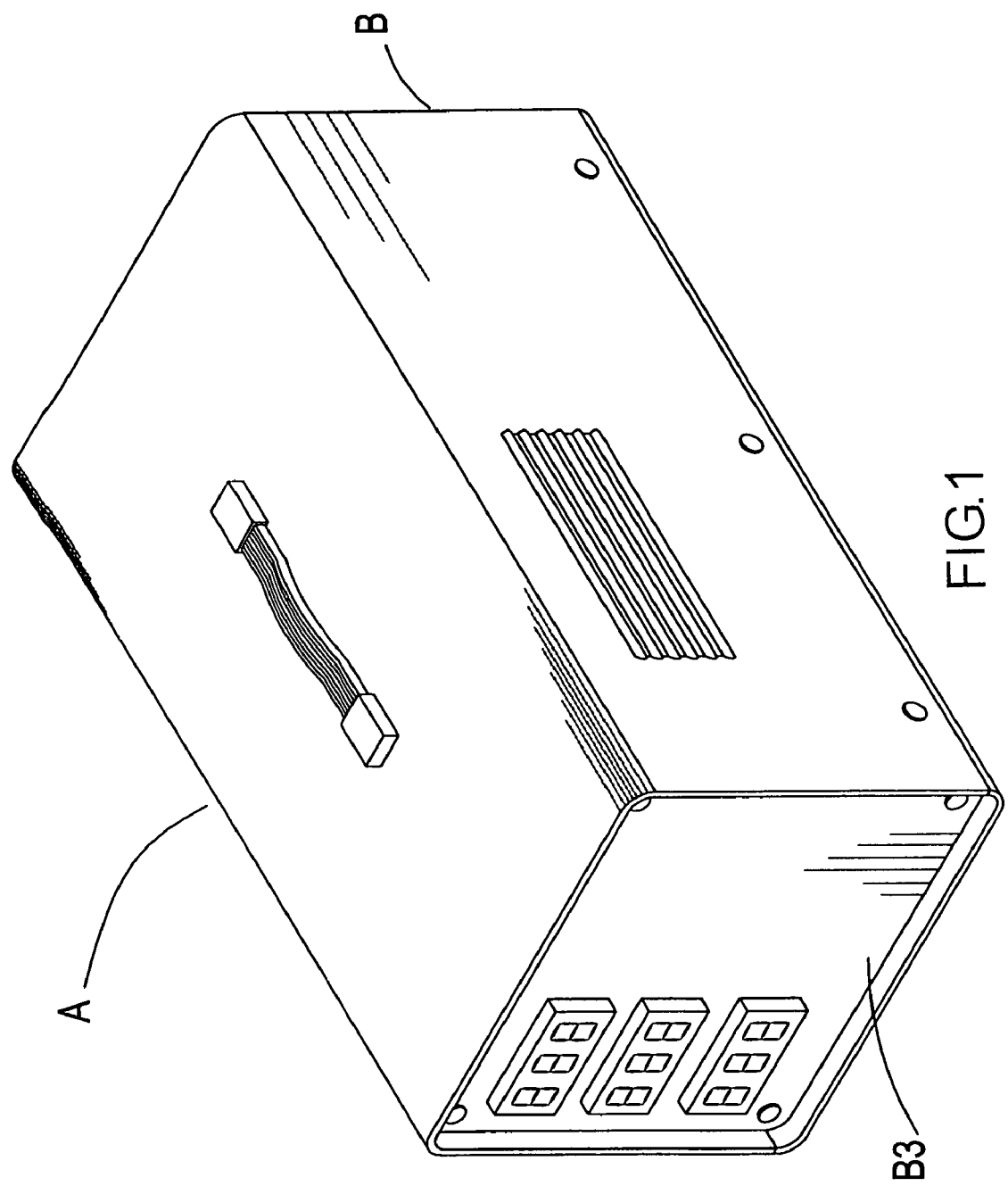
FIG. 1 shows an elevational view according to the present invention.
Figure 2:
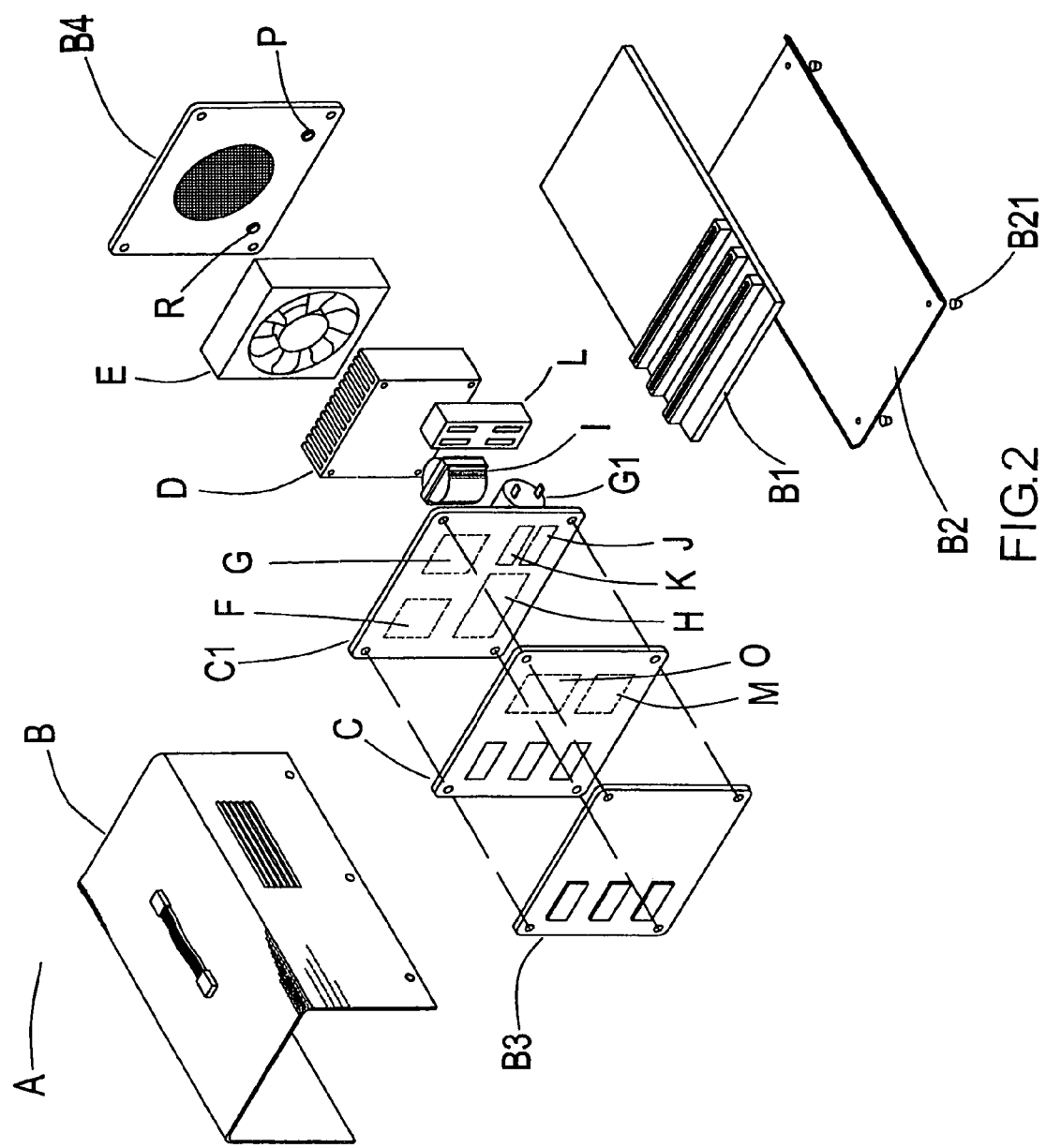
FIG. 2 shows an exploded elevational view according to the present invention.

Referring to FIGS. 1 and 2, which show a charger A structured to comprise a case B, a base B1, a base plate B2, a face plate B3, a ventilation plate B4, a control circuit board C, a drive circuit board C1, heat dissipating fins D, a fan E, an output terminal P, and an input terminal Q, and is characterized in that:

A detector M and a microprocessor O are configured atop the control circuit board C;

Rectifier circuits F and J, wave filter circuits G and K, and a control circuit H are configured atop the drive circuit board C1.

Structural characteristics of the present invention are embodied in a choke coil L and a transformer I disposed atop a plane surface of the heat dissipating fins D. Furthermore, the face plate B3, the control circuit board C, the drive circuit board C1, the heat dissipating fins D, the fan E and the ventilation plate B4 adopt a separately series-connected alignment and are installed atop the base B1 thereof, whereupon the case B is placed on top and screwed down with screws, and thereafter a base portion is screwed down by means of base screws B21 penetrating the base plate B2.

Figure 3:
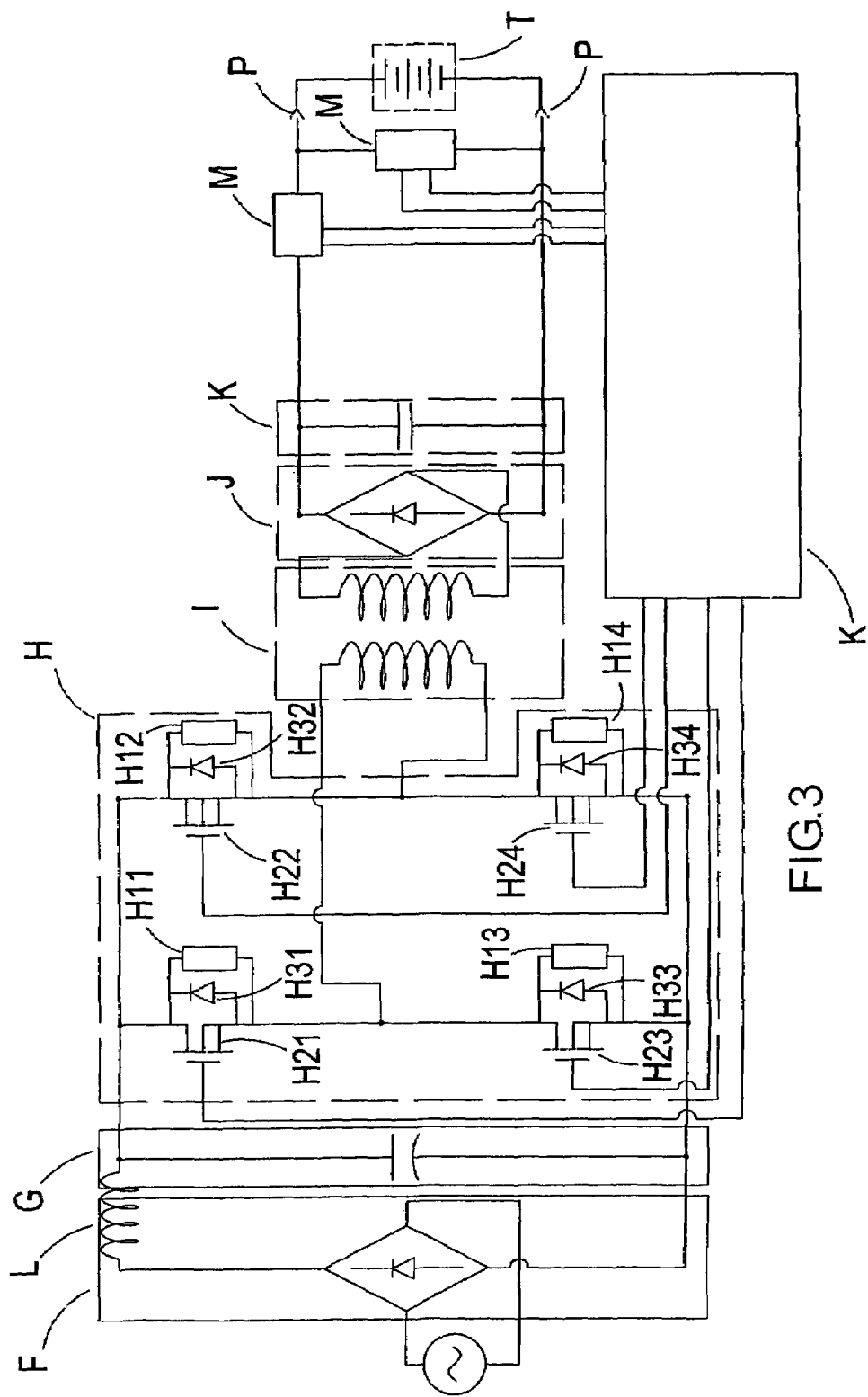
FIG. 3 shows a circuit diagram according to the present invention.

Referring to FIGS. 2 and 3, characteristics of an electric circuit embodied in a configuration whereby external power supply input is transmitted to the drive circuit board C1 through the input terminal Q, whereupon alternating current passes through a rectifier electric circuit F and is converted into direct current thereat. Efficiency and stability of the electric power is enhanced through impedance matching generated by way of a choke coil L, whereafter the electric power is transmitted to a wave filter circuit G, and utilizes refresh and discharge generated by capacitance G1 of the wave filter circuit G to complete filtering, thus enabling the power supply to provide steady direct current therewith. Upon charging, the detector M detects status of voltage, electric current and electric quantity within a battery T waiting to be charged, results of which are transmitted to the microprocessor O. Thereafter, the microprocessor O selects charge mode for the battery T waiting to be charged and effectuates switch over to output circuit mode by means of transistors H21, H22, H23, H24, while diodes H31, H32, H33 and H34 prevent current reflux. The electric power output is further stabilized through regulated integrated circuits H11, H12, H13 and H14, whereupon, in order to prevent electric current generated by the battery T from backing up to other electric circuits, the electric power further passes through the rectifier circuit J and the wave filter circuit K by way of the transformer I coupled to an electric power terminal, which further enhances stability of the electric power, whereafter the electric power is transmitted to the battery T.

Furthermore, upon inputting the electric power, efficiency and stability of charging the battery T is enhanced through the impedance matching generated by way of the choke coil L, and with the choke coil L adopting a ferrite core as a configuration, anti-noise and high impedance matching of the choke coil L is enhanced. Wherein the rectifier circuit F is further configured as an alternating current rectifier, including a half-wave rectification rectifier circuit, a full-wave rectification rectifier circuit, a bridge rectifier circuit and related alternating current rectifier circuits.

Wherein the wave filter circuit G is further configured as an electric resistance-capacitance wave filter and related wave filters of electric power electronics.

Wherein the microprocessor O is further configured as an AVR Mega series and related microprocessors of automatic control electronic circuits.

Wherein, the detector M is configured with functionality to detect voltage, electric current, and electric quantity therewith.

Figure 4:
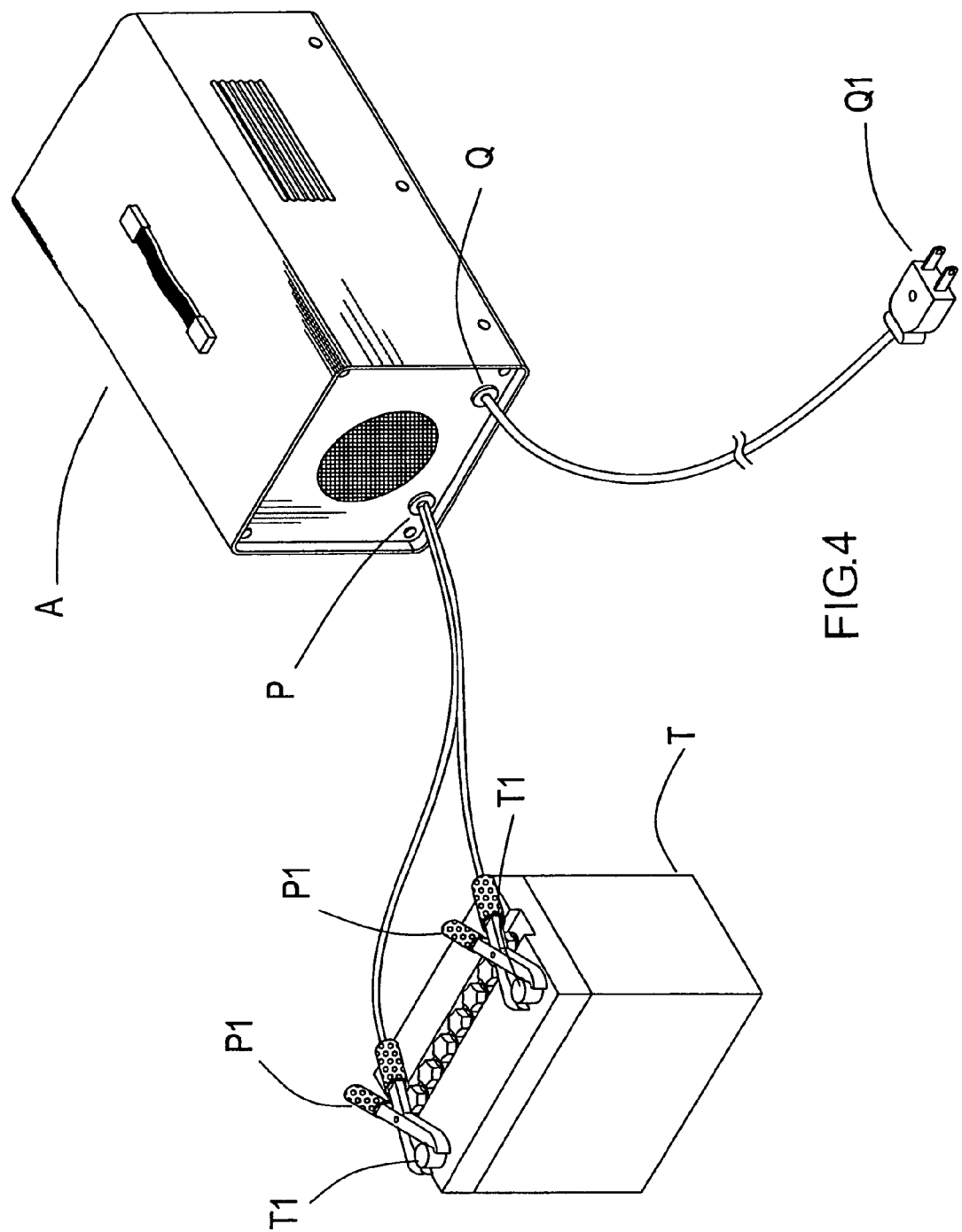
FIG. 4 shows a schematic view of an embodiment according to the present invention.

An embodiment of the present invention provides improvement on structure of a charger. Referring to FIG. 4, which shows a plug Q1 connected to an input terminal Q, which realizes electrical power transmission to a charger A therewith. The electric power is transmitted out from a clamp P1 connected to an output terminal P and into a battery T through electric circuits within the charger A. The clamp P1 of the charger A is clamped onto and thereby connected to a battery terminal T1 of the battery T, thus effectuating transmission of the electric power into the battery T.

In order to better explicitly disclose advancement and practicability of the present invention, a comparison with a conventional charger is described hereinafter:

Shortcomings of the Conventional Charger

1. Unable to automatically distinguish the electric power required by a battery.

2. Unable to control the electric power output according to the electric power mode of the battery.

3. Unable to adjust the electric power output according to internal electric quantity of the battery, and thus easily results in reducing service life of the battery.

Advantages of the Present Invention

1. Provided with a microprocessor, which automatically distinguishes the electric power required to charge the battery.

2. Utilizes a detector circuit and a control circuit to automatically switch over electric power output and charge mode.

3. Automatically differentiates various charge modes, including steady voltage, steady current, and so on.

4. Enhances efficiency of the charge and service life of the battery.

5. Provided with advancement, practicability and convenience.

6. Enhances commercial competitiveness.

In conclusion, the present invention in surmounting structural shortcomings of prior art has assuredly achieved effectiveness of anticipated advancement, and moreover, is easily understood by persons unfamiliar with related art.

Furthermore, contents of the present invention have not been publicly disclosed prior to this application, and advancement and practicability of the present invention comply with essential elements as required for application of a new patent model. Accordingly, a patent application is proposed herein.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A charger comprising a case, a base, a base plate, a face plate, a ventilation plate, a control circuit board, a drive circuit board, heat dissipating fins, a fan, an output terminal, and an input terminal;

a detector and a microprocessor are configured atop the control circuit board;

rectifier circuits, wave filter circuits, and a control circuit are configured atop the drive circuit board;

structural characteristics comprise a choke coil and a choke iron core disposed atop a plane surface of the heat dissipating fins; the face plate, the control circuit board, the drive circuit board, the heat dissipating fins, the fan and the ventilation plate adopt a separately series-connected alignment and are installed atop the base thereof, whereupon the case is placed on top and screwed down with screws, and thereafter a base portion is screwed down by means of base screws penetrating the base plate;

characteristics of an electric circuit comprise an external power supply input transmitted to the drive circuit board through the input terminal, whereupon alternating current passes through a rectifier electric circuit and is converted into direct current thereat; efficiency and stability of electric power is enhanced through impedance matching generated by way of the choke coil, whereafter the electric power is transmitted to the wave filter circuit, thus enabling the power supply to provide steady direct current therewith; upon charging, the detector detects status of voltage, electric current and electric quantity within a battery, results of which are transmitted to the microprocessor, thereafter, the microprocessor selects charge mode for the battery and switches over to output circuit mode by means of transistors, while diodes prevent current reflux;

the electric power output is further stabilized through regulated integrated circuits, whereupon, in order to simultaneously prevent electric current generated by the battery from backing up to other electric circuits, the electric power further passes through the rectifier circuit and the wave filter circuit by way of a transformer coupled to an electric power terminal, which further enhances stability of the electric power, whereafter the electric power is transmitted to the battery;

upon inputting the electric power, efficiency and stability of charging the battery is enhanced through the impedance matching generated by way of the choke coil, and with the choke coil adopting a ferrite core as a configuration, anti-noise and high impedance matching of the choke coil is enchanced;

and wherein the detector is configured with functionality to detect voltage, electric current, and electric quantity therewith.

2. The charger according to claim 1, wherein the rectifier circuits are further configured as alternating current rectifiers, including half-wave rectification rectifier circuits, full-wave rectification rectifier circuits, bridge rectifier circuits and related alternating current rectifiers.

3. The charger according to claim 1, wherein the wave filter circuits are further configured as electric resistance-capacitance wave filters and related wave filters of electric power electronics.

4. The charger according to claim 1, wherein the microprocessor is further configured as an AVR Mega series and related microprocessors of automatic control electronic circuits.

5. The charger according to claim 1, wherein the transistors are further configured as FETs (Field-Effect Transistors), MOSs (Metal Oxide Semiconductors), BJTs (Bipolar Junction Transistors), and related transistors of electronic circuits.

* * * * *